(12) United States Patent
Nicholson

(10) Patent No.: US 7,004,638 B2
(45) Date of Patent: Feb. 28, 2006

(54) SEALING SYSTEM FOR CONNECTOR

(75) Inventor: Allan Nicholson, Cumbria (GB)

(73) Assignee: Diamould Limited, Barrow-in-Furness (GB)

( * ) Notice: Subject to any disclaimer, the term of this patent is extended or adjusted under 35 U.S.C. 154(b) by 62 days.

(21) Appl. No.: 10/495,248

(22) PCT Filed: Dec. 6, 2002

(86) PCT No.: PCT/GB02/05540

§ 371 (c)(1),
(2), (4) Date: May 12, 2004

(87) PCT Pub. No.: WO03/048827

PCT Pub. Date: Jun. 12, 2003

(65) Prior Publication Data

US 2005/0002617 A1 Jan. 6, 2005

(30) Foreign Application Priority Data

Dec. 6, 2001 (EP) .................................. 01310203

(51) Int. Cl.
*G02B 6/36* (2006.01)
(52) U.S. Cl. .............................. 385/53; 385/55; 385/58
(58) Field of Classification Search .................... 385/53
See application file for complete search history.

(56) References Cited

U.S. PATENT DOCUMENTS

| | | | | | |
|---|---|---|---|---|---|
| 3,533,430 | A | * | 10/1970 | Fredd | 137/112 |
| 3,856,085 | A | * | 12/1974 | Holden et al. | 166/264 |
| 4,059,153 | A | * | 11/1977 | Nix et al. | 166/264 |
| 4,220,176 | A | * | 9/1980 | Russell | 137/496 |
| 4,619,325 | A | * | 10/1986 | Zunkel | 166/374 |
| 5,738,535 | A | * | 4/1998 | Cairns | 439/138 |
| 5,931,132 | A | * | 8/1999 | Freeland | 123/90.43 |
| 5,937,123 | A | * | 8/1999 | Frelier | 385/79 |
| 6,402,539 | B1 | * | 6/2002 | Toth et al. | 439/367 |
| 6,439,778 | B1 | * | 8/2002 | Cairns | 385/60 |

FOREIGN PATENT DOCUMENTS

| | | |
|---|---|---|
| EP | 0 538 089 | 4/1993 |
| WO | 99 21041 | 4/1999 |
| WO | 99 31540 | 6/1999 |

\* cited by examiner

*Primary Examiner*—Ellen E. Kim
(74) *Attorney, Agent, or Firm*—Dykema Gossett; Wayne I. Kanak

(57) ABSTRACT

A sealing system for use with a sub-sea connector. The sealing system comprises an actuation sleeve retaining a ball valve within the exposed end of the sleeve and a valve control system connecting the ball valve to an actuation member and applying a force to the ball valve such that it is urged into a closed position. A biassing means controls the sealing force of the ball valve.

15 Claims, 10 Drawing Sheets

SEALING SYSTEM FOR CONNECTOR

This invention relates to a sealing system for a connector such as an optical fibre connector. It relates to an optical fibre connector for use in exceptionally harsh environments, such as sub-sea and oil well applications.

In recent times there has been an increasing need to provide complex machinery in sub-sea locations for use in oil and gas wellheads as well as for other sub-sea applications. As part of this increased use of complex machinery there is a need to provide adequate communication and control connections to such machinery, and this has led to a desire to enable optical communications to be employed to improve, in particular, data communications with such machinery.

However, equipment associated with sub-sea and oil/gas well applications experiences high pressure and temperature during continuous operation. Furthermore, the environments in which such equipment is being operated are harsh in terms of levels of particulate contaminants and the potential for sea water or well fluid ingress.

Accordingly, it is exceptionally difficult to provide connections for optical fibre communications which are capable of withstanding the high pressures and temperatures involved in continuous operation, as well as providing a sufficient barrier to contamination from sand, grit, etc. In addition, it is extremely difficult to provide connectors which protect the optical fibres to be connected prior to connection as well as to provide connectors which are simple to operate remotely and/or in harsh environments. In this regard, it is particularly difficult to produce a connector which has adequate sealing which can be opened and closed under relatively low insertion force.

The present invention seeks to provide a connector assembly for use with optical fibres that can be employed in a harsh environment, such as a sub-sea or well-bore location, yet which overcomes some of the above problems.

According to the present invention there is provided a sealing system for use with a sub-sea connector, the sealing system comprising: an actuation sleeve retaining a ball valve within the exposed end of the sleeve, the ball valve providing a sealing function when in a closed position; a valve control system connecting the ball valve to an actuation member and for rotating the ball valve into an open position when the connector is being operated and applying a force to the ball valve such that it is urged into a closed position when not being operated; and biassing means for controlling the sealing force provided by the ball valve independently to the valve control system.

The system may be for optical fibres but could equally be considered for hydraulic or electrical applications., The valve control system may comprise actuation links, one end of each of which is attached directly to the ball valve, and the other end of which is connected to a rotating cam by means of a roller. A second biassing means may be provided to bias the valve control system such that the ball valve is urged toward a closed position.

According to the present invention there is further provided a sub-sea fibre optic connector comprising a female receptacle unit and a male plug unit, each unit further comprising a fibre optic wand within a shuttle assembly, the shuttle assembly being located within a housing unit, and a sealing system of the type described above provided at the exposed end of the shuttle assembly to prevent the fibre optic wand from being exposed to the environment prior to engagement of the two units.

A diaphragm system may be introduced between the housing unit and the shuttle assembly. The housing unit may comprise vent ports to enable elimination of debris from the optical connector during engagement. The diaphragm system may be made from a thermosetting rubber, such as a perfluoroelastomer, but could equally be a metallic bellows to allow for thermal expansion and displacement of the actuation shuttle pin. The ball valve material may be ceramic or a corrosion resistant metal such as titanium. The ball may also be coated with a low friction coating such as polytetrafluoroethylene or titanium nitride. To provide effective sealing, the ball valve may be fitted with a resilient seal to seat on a spherical profile of the shuttle pin bore, or the ball valve seating face may be precisely honed and lapped to provide an intimate seal.

The shuttle assembly may be filled with oil to enhance movement of the components and the fibre optic wand through lubrication, to exclude debris and to prevent deterioration of the internal components. This fluid may be optically matched to the optical characteristics of the connector, thus minimising any loss in optical performance of the connector in operation.

The fibre optic wand of the plug unit may further comprise a solid ceramic or metallic alignment sleeve with integral vent port features. The solid alignment sleeve serves to align both optical wands as they are brought together during the mating process, and vent the optically matched oil in the process.

The present invention provides an effective sealing system that can prevent contamination, even in harsh environments. It also provides a sealing system that can be operated remotely with a high degree of reliability and with a controlled insertion force.

Examples of the present invention will now be described with reference to the accompanying drawings, in which.

Figure 1A:
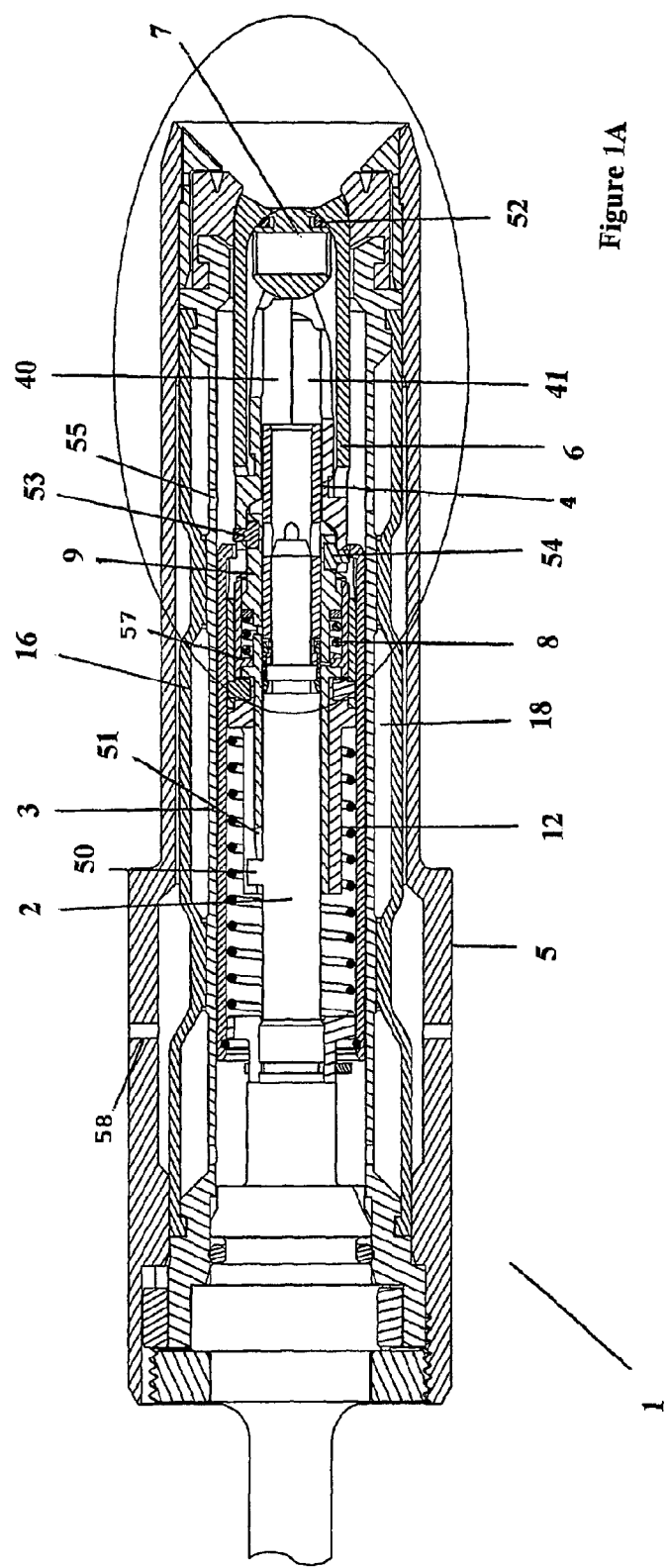
FIGS. 1A and 1B show a female element of an example connector according to the invention.
Figure 1B:
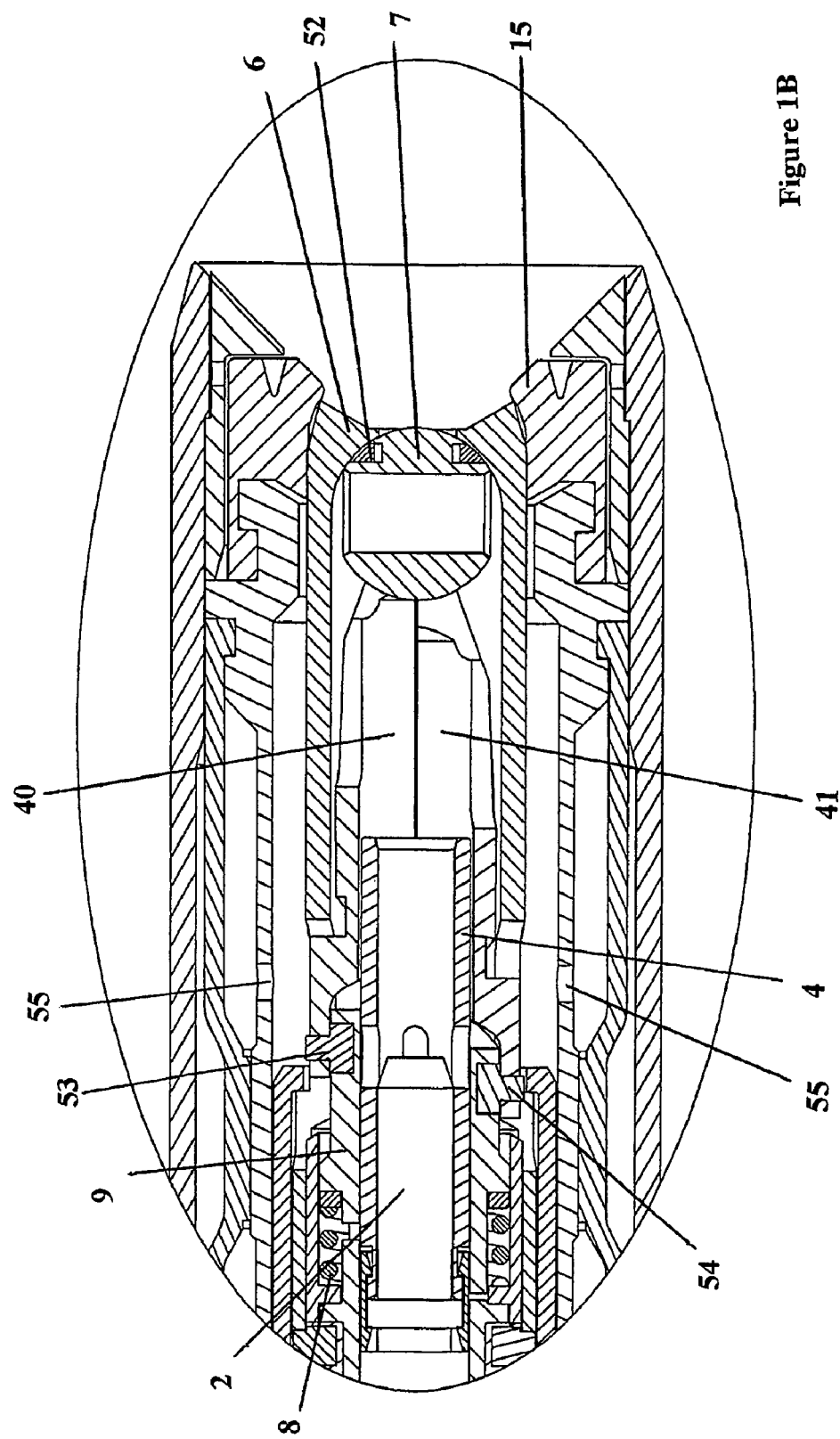

The connector of the present invention comprises two primary elements, the first of which is illustrated in FIG. 1A. This female element 1 comprises a fibre optic wand 2 with a solid alignment sleeve 4. The main structure of the female element 1 is provided by a housing unit 5 which encloses a shuttle pin 6. An enveloping sleeve 3 surrounds the shuttle pin 6 and controls its stroke length. The end of the shuttle pin 6 is sealed by a ball valve 7 with radial seal 52. Within the shuttle pin a spring 8 is provided to bias an actuation cam 9 and rods 40, 41 and rollers 53, 54 toward the ball valve 7. This spring force causes the ball valve 7 to be in a sealed position when the male and female primary elements of the connector are disconnected as illustrated in FIG. 1B and can be selected to provide a reliable sealing force if necessary without significantly affecting the values of the insertion forces required to operate the connector.

A diaphragm system 16 comprises a bellows type arrangement which is capable of flexing in the positive and negative sense during the engagement process. This diaphragm 16 seals and equalises pressure inside the connector oil 18 through ports 55. Ports 58 allow external pressure to be transmitted to the diaphragm 16 to equalise connector pressure. Wiper seal 15 serves to retain the optically matched lubrication oil 18 in the vicinity of the shuttle assembly to enhance movement of the components and wipe male shuttle pin of debris and contaminants. The oil 18 also serves to exclude debris and to prevent deterioration of the internal components.

Figure 2A:
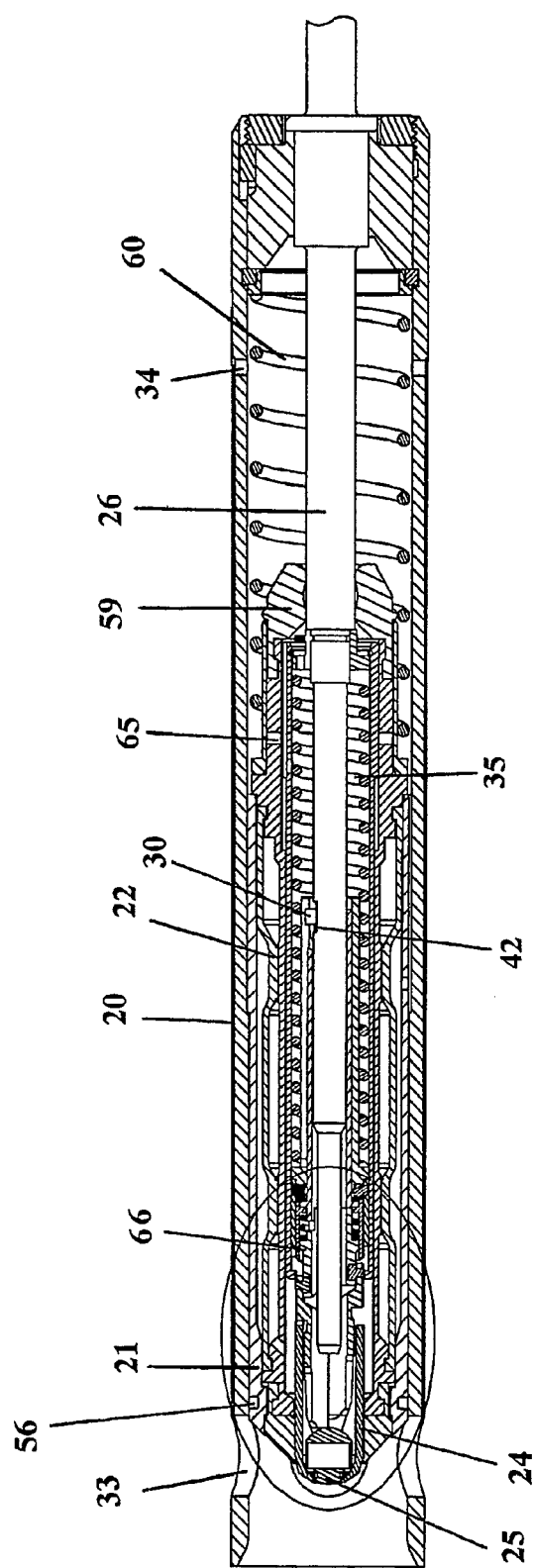
FIGS. 2A and 2B illustrate a male element of an example connector according to the invention.
Figure 2B:
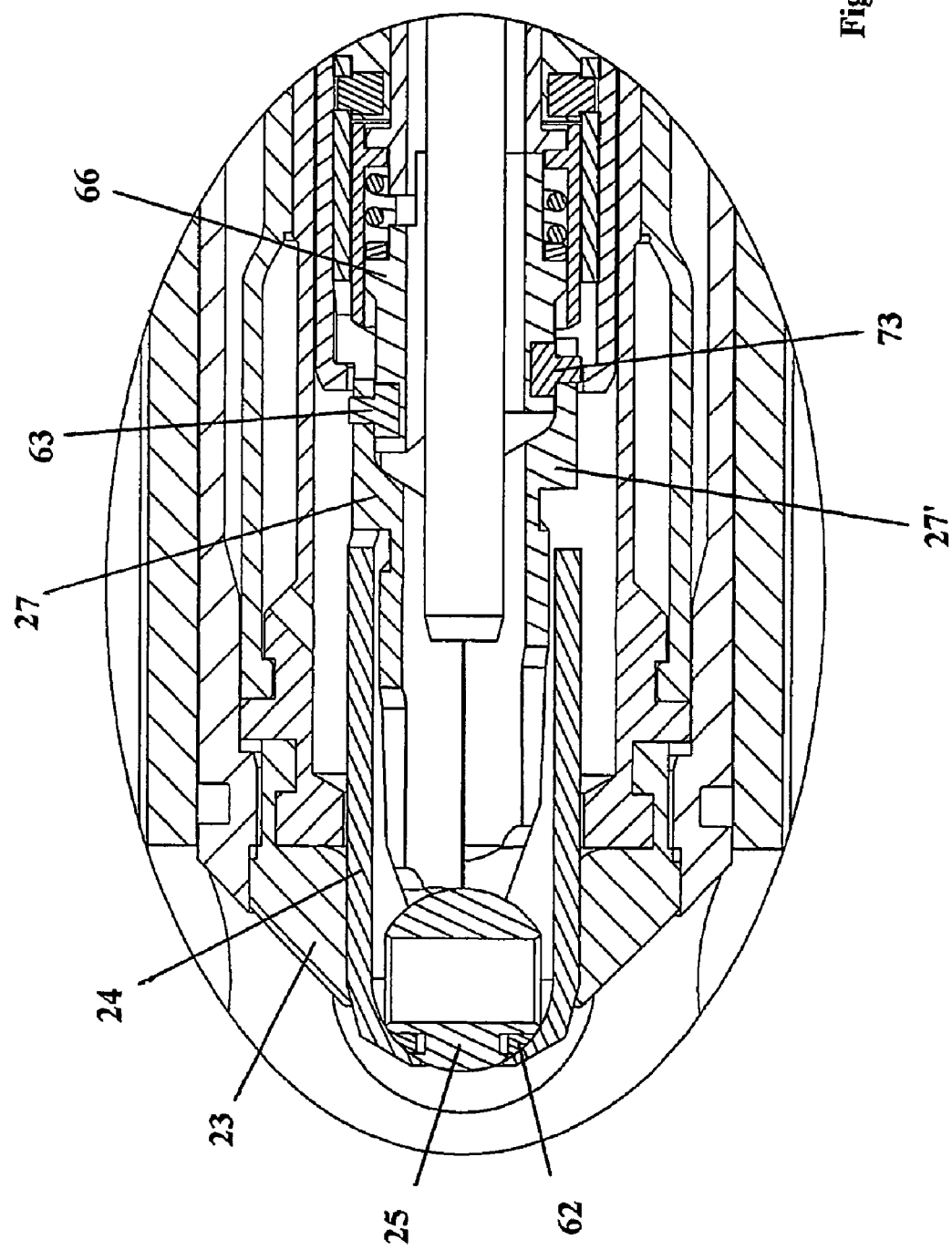

The male primary element is illustrated in FIGS. 2A and 2B. Once again a housing unit 20 is provided comprising outer structure 21, diaphragm system 22 and front wiper seal 23 and rear wiper seal 59. The receptacle wand sealing system is configured as a moving shuttle assembly biased in a forward position by spring 60 A debris scraper 56 prevents entry of sand particles interfering with the shuttle assembly as it moves backwards or forwards during engagement. Vent ports 34 allow water to be ejected from the rear face of the shuttle assembly providing free movement of the shuttle assembly. Within this housing unit is a shuttle pin 24 sealed by a ball valve 25 with Integral seal 62 and enclosing a fibre optic wand 26. The fibres of the fibre optic wands 26 & 2 may be protected by means of hermetically sealed, optically clear windows. They may also be configured such that the light is expanded by means of a lens to form a beam of collimated light such that it can be passed efficiently from one wand to the other across a small gap of optically matched fluid. Alternatively, the optical wands may contain ceramic or metalic ferrules which provide a sealing function for the fibre, and an accurate means of aligning the fibres to form a face to face contact of the fibre optic cable. The mechanism for actuating the ball valve 25 is very similar to that for the female element 1 of the connector and can be seen in FIG. 5. In this case the ball valve 25 and seal 62 is rotated about its central axis by pin 30 engaging with slot 42 of the driver mechanism and moving the link members 27, 27' with rolling pins 63, 73, by rotating cam 66 to provide a clear passageway, through which the fibre optic wand 26 passes through upon connection. A spring 59 provides the sealing force for ball valve 25.

The receptacle (male) unit is normally configured so that it faces upwards in a well bore application and the central features of the connector sealing system are configured as an external conical shape to deflect debris on engagement of the connectors.

Like wise, the plug (female) connector's central sealing profile is configured as a internal cone profile to intimately match that of the receptacle, to ensure minimum retention of water and debris.

Figure 5:
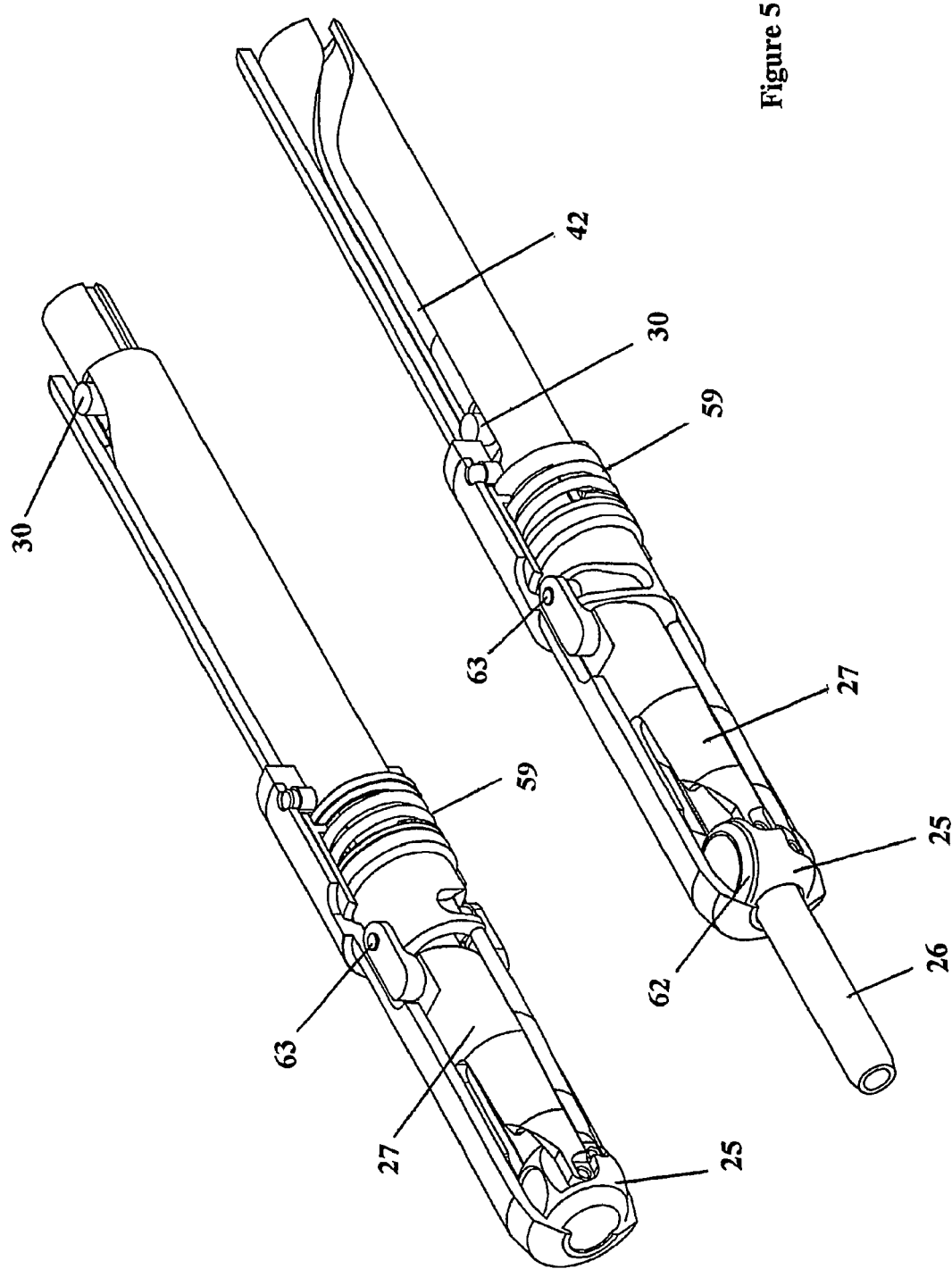
FIG. 5 is a side perspective view of a male wand in engaged and disengaged positions.

Upon connection of the male and female primary elements the plug unit enters the receptacle flared housing behaving like a piston in a bore and flushes out water and or drilling mud and sand particles in the process through large side vent ports 33. The plug unit sealing face profile then intimately meets the male sealing profile. At this point, the shuttle pin 6 is driven into the housing unit 5 against biassing means 12. As this biassing means 12 is compressed the actuation cam 9 rotates relative to the fibre optic wand 2 and its alignment sleeve 4. This rotational motion is generated by a pin 50 engaging with a slot 51 located on the cam 9, the slot being curved and movable relative to the pin 50. A control sleeve 57 which is pinned to shuttle pin 6 by pins 58 external to the cam 9 prevents relative rotation of the shuttle pin assembly by engaging pin 50. Linking rods 40 and 41 are keyed into shuttle pin housings such that they are constrained to move backwards and forwards only. Roller pins in the linking rods 40, 41 engage with the cam 9 and the cam 9 is shaped such that it generates relative motion in the linking rods 40, 41, which in turn rotate the ball valve 7 until it reaches an open position. This action occurs against the biasing force of the biasing spring 12, which therefore effectively controls the insertion force of the connector. This means that the insertion force can be controlled separately to the sealing force applied to the ball valve 7 via sealing spring 8. This operation opens the route for the fibre optic wand 26 of the male primary element to enter. A similar operation occurs for the male wand 26 and is shown in FIG. 5.

Figure 3A:
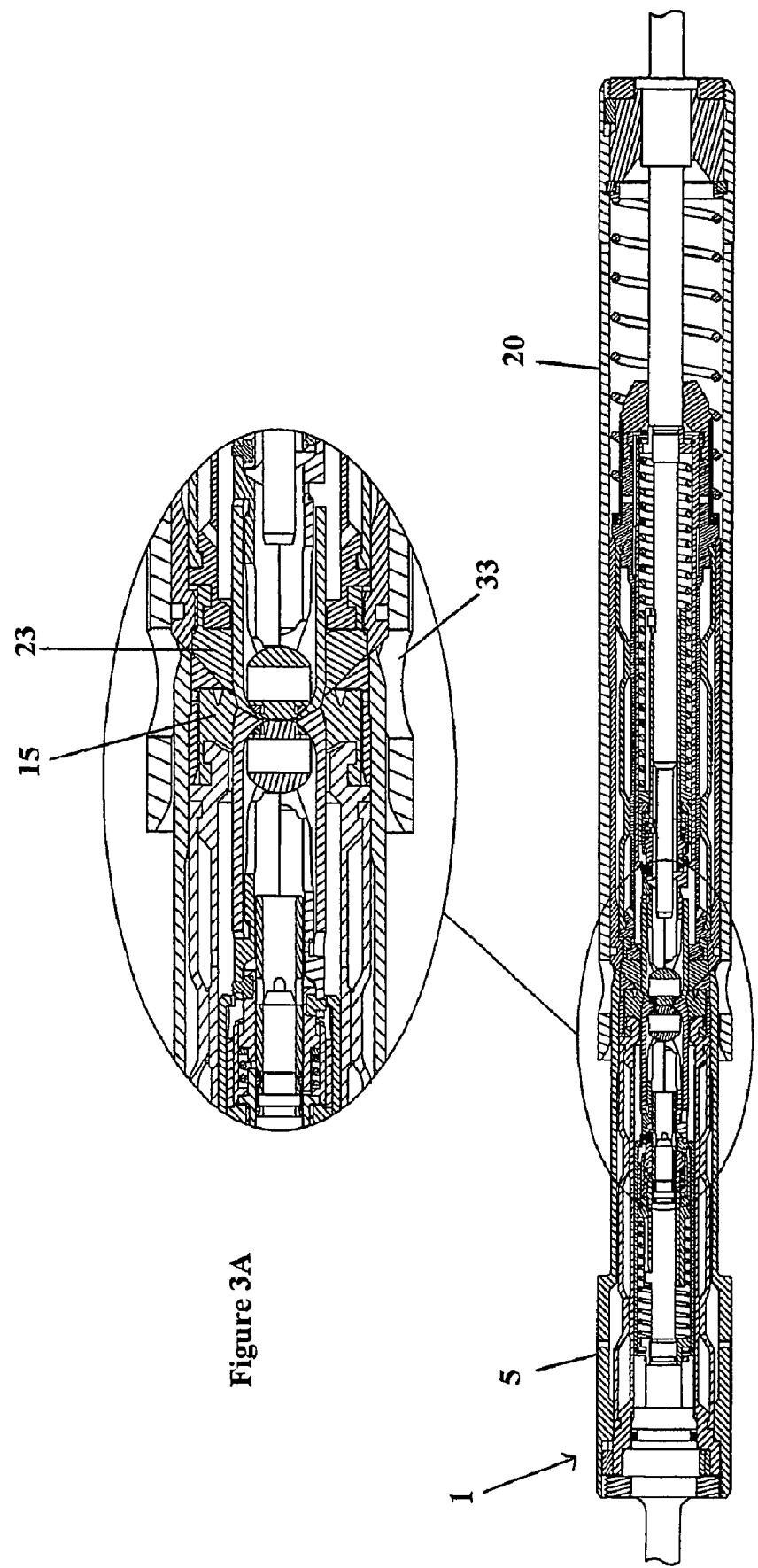
FIGS. 3A to 3D illustrate the engagement sequence of the connector of FIGS. 1A to 2B.
Figure 3B:
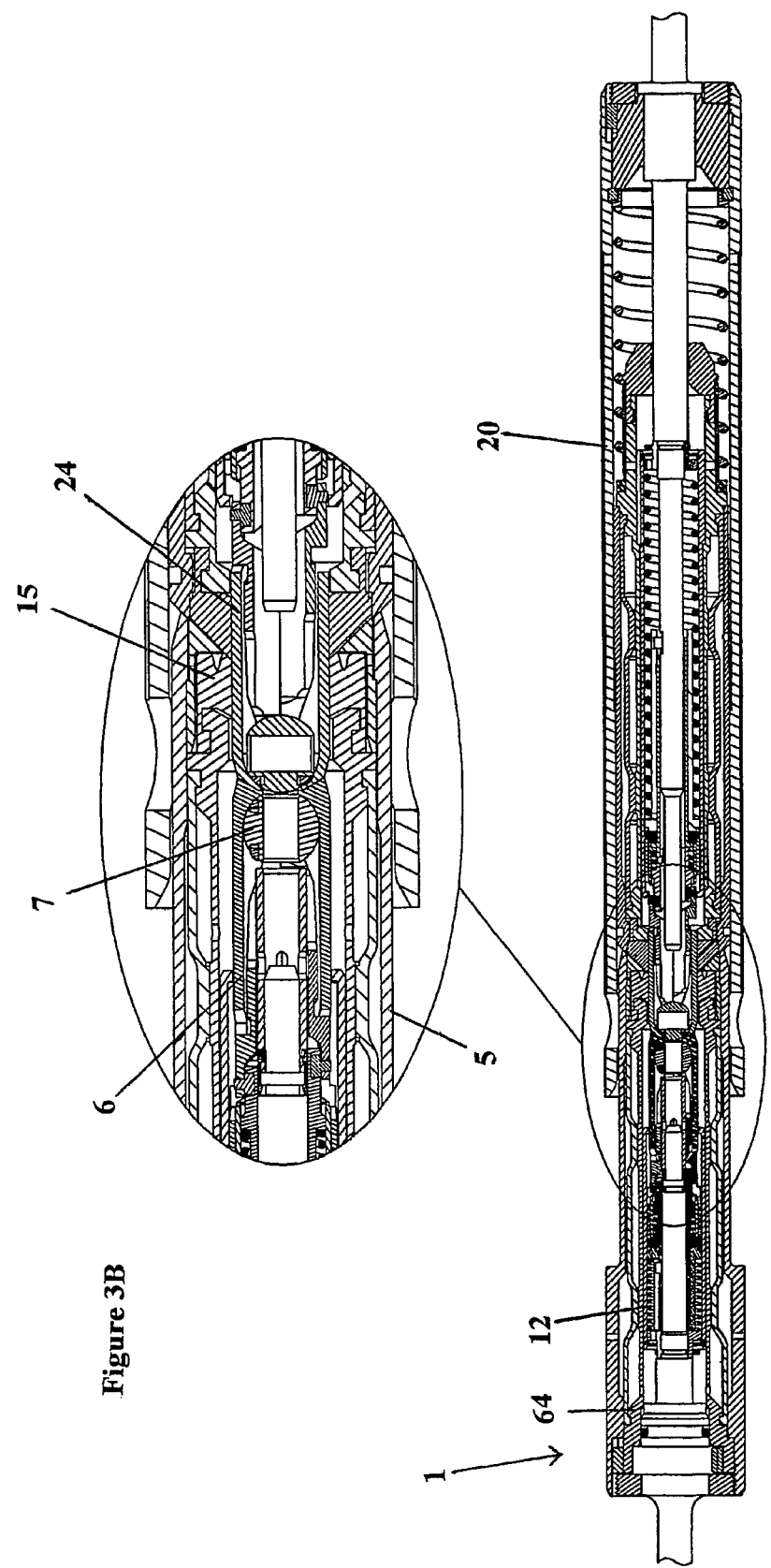

The connection sequence of the male and female elements is illustrated in FIGS. 3A to 3D. As the elements are brought together the housing unit 5 of the female element 1 is inserted into the housing unit 20 of the male element. The housing unit 5 of the female element abuts the wiper seal 23 of the male component. Any debris is ejected through port 33 as the initial engagement is made (FIG. 3A). As the components are further engaged the wiper seal 15, of the female element 1, is transferred from the female shuttle pin 6 to seal on the male shuttle pin 24. Meanwhile the female shuttle pin 6 is urged back into the housing 5 against spring 12 until it abutts to housing 64 such that the ball valve 7 of the female component 1 is opened as described above and as illustrated in FIG. 3B.

Figure 3C:
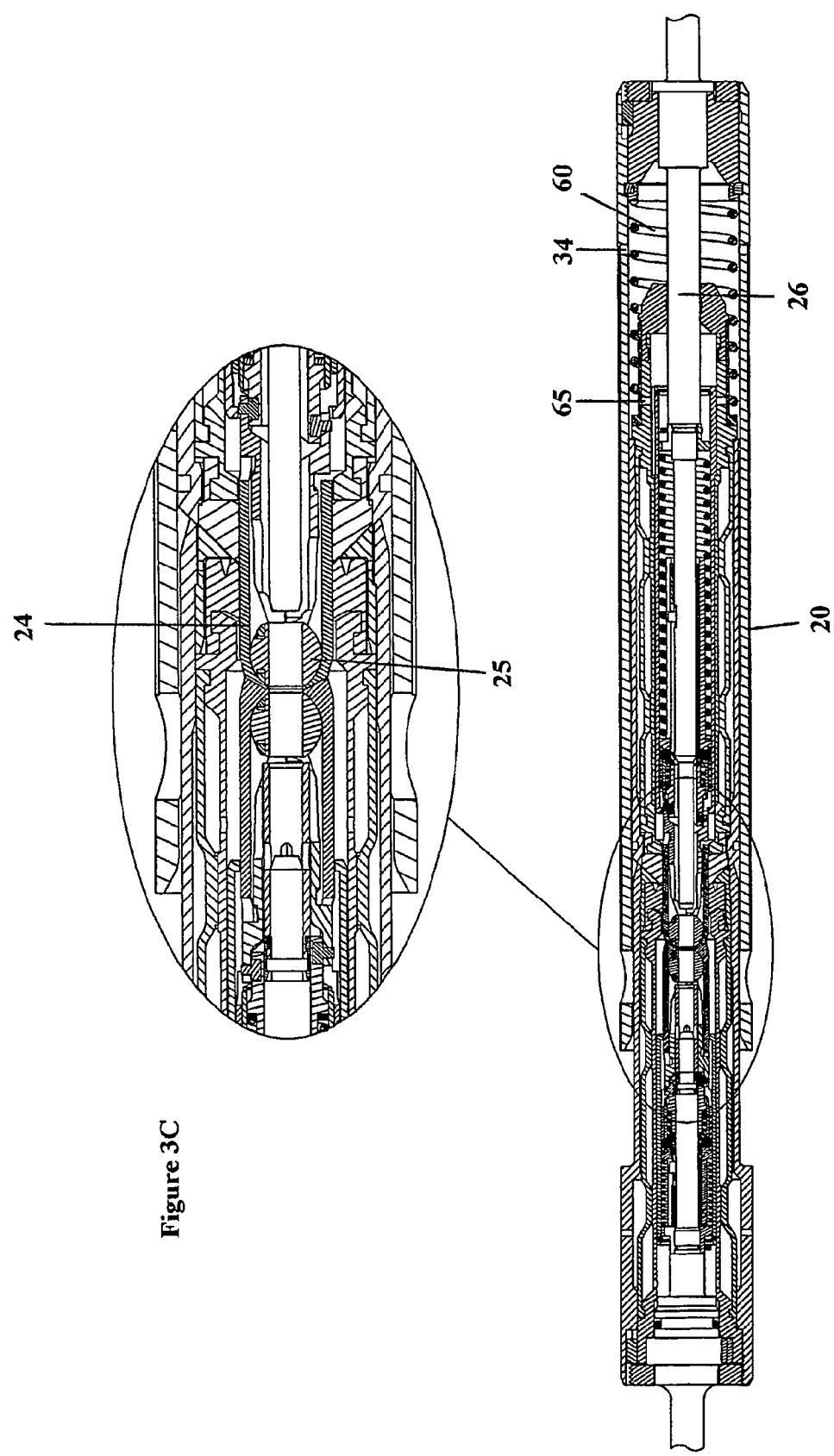

FIG. 3C illustrates the next stage of engagement where the shuttle pin 24 of the male component is forced back into the housing 20 and the sealing shuttle assembly is urged back against spring 60 ejecting any sea water through vent ports 34. This relative motion between the shuttle pin 24 and the male fibre optic wand 26 opens the ball valve 25 as described earlier such that the male wand 26 protrudes through into the female component 1. At this stage, any small amounts of trapped water are flushed through the alignment sleeve vent ports 65 as the male wand 26 moves through the ball valves 7, 25 and into the alignment sleeve 4 by displacing oil 18.

Figure 3D:
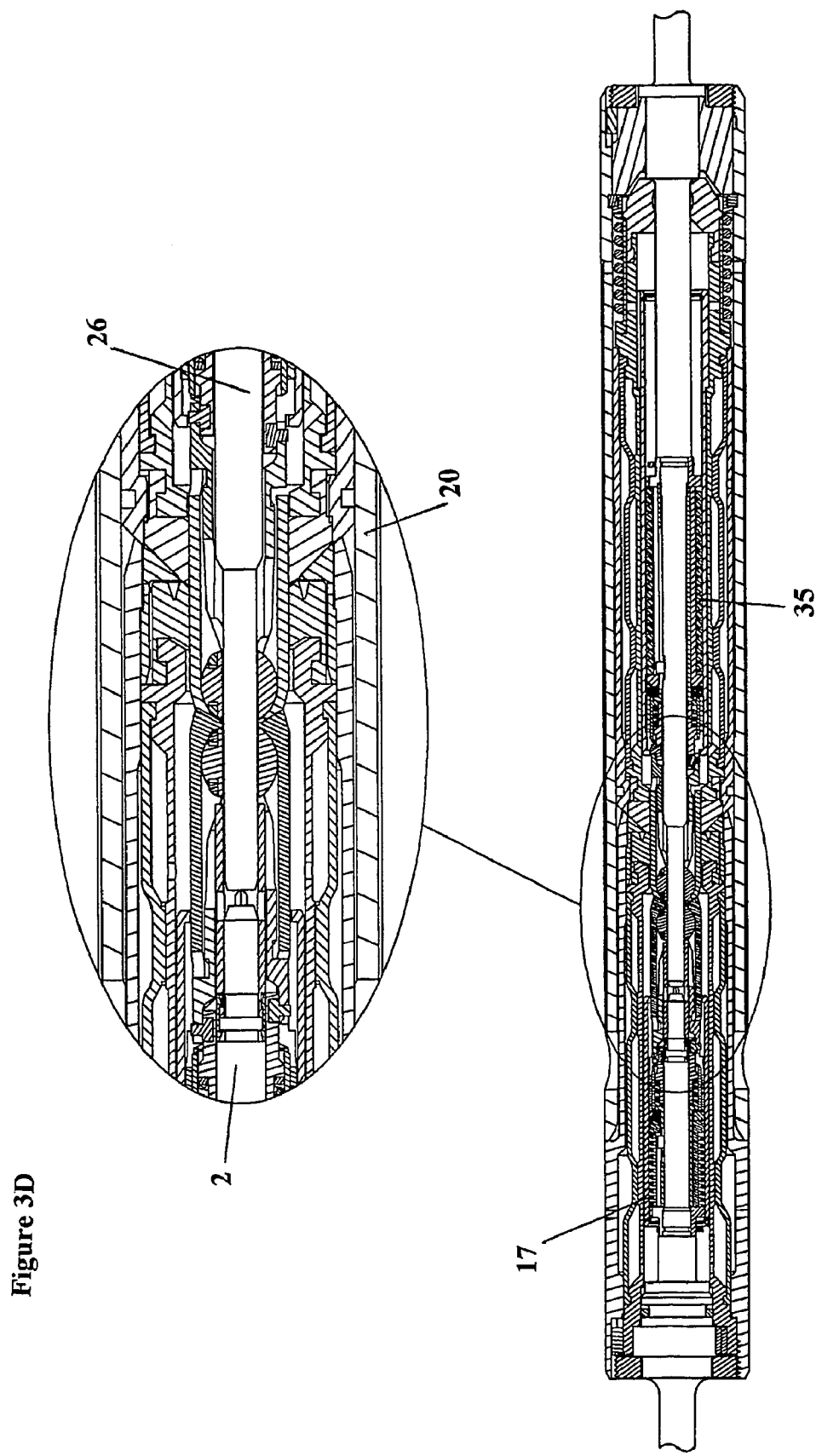
Figure 4:
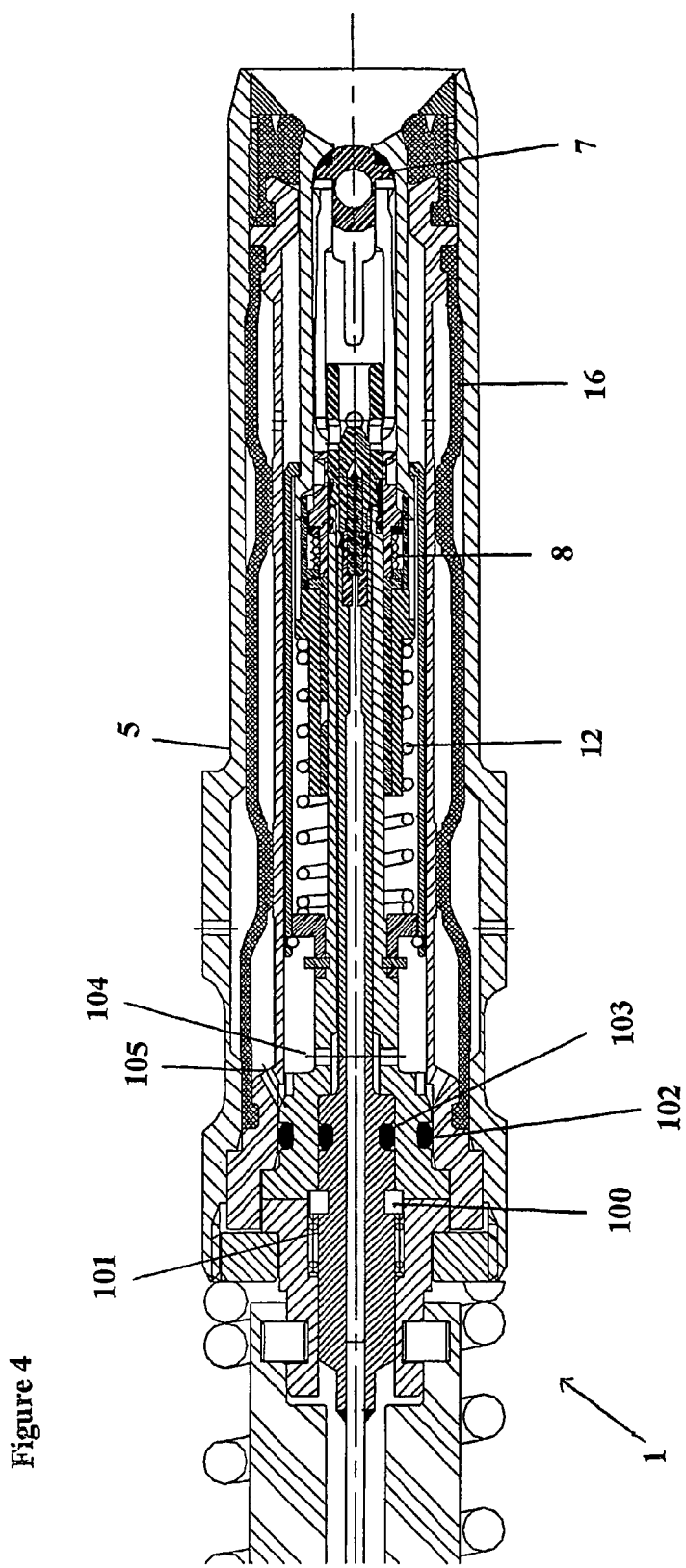
FIG. 4 is a cross-sectional view of an alternative fibre optic wand assembly in combination with a female element.

The final stage of engagement is illustrated in FIG. 3D which shows the optical wands 2, 26 and the housing units 5, 20 in abutment with their respective components. The optical wands 2, 26 may abut face to face (see below) but in the example of FIGS. 1 to 3 do not. The example of FIGS. 1 to 3 is for an arrangement where the male and female wands (26,2) are in optical engagement once coupling has occurred, but in which they do not physically engage with one another. When it is desirable for them to physically engage with one another it is necessary to provide compliance within the wands to ensure that the connector can cope with tolerances in the insertion direction. In order to provide this a wand assembly of the type shown in FIG. 4 may be provided. In this example the assembly is shown on the female part 1 of the connector, but it could equally be on the male part. In this configuration components that correspond to those of the earlier figures are numbered identically. Here the female wand 2 has a split ring 100 formed around a portion thereof, the split ring 100 engaging with a wand spring 101 such that the wand 2 can be urged down against the spring 101 via the split ring 100. Additional sealing O-rings 102, 103 are provided to ensure that ingress of water or contaminants is prevented. In addition, to ensure that oil can flow within the components during insertion and that such oil 18 does not cause the components to lock up, additional oil ports 104 are provided to allow oil flow, and the position of the oil ports 105 connected with the bellows 16 has also been moved with respect to their position FIGS. 1 to 3.

With the arrangement of the present invention the relative values of the forces applied by the springs 12 and 35 can be controlled to select which of the ball valves is actuated first to enable appropriate sequential operation of the connector and therefore reduce the likelihood of contamination of the fibre optic wands. Furthermore, compared to prior art devices, there is a greater level of design flexibility in terms of control of the sealing forces that can be applied, as well as providing a device with simple and reliable actuating mechanisms.

The invention claimed is:

1. A sub-sea fibre optic connector comprising a female plug unit and a male receptacle unit, at least one unit comprising:
   - a fibre optic wand within a shuttle assembly, the shuttle assembly being located within a housing unit; and
   - a sealing system comprising:
     - an actuation sleeve retaining a ball valve within the exposed end of the sleeve, the ball valve providing a sealing function when in a closed position;
     - a valve control system connecting the ball valve to an actuation member and for rotating the ball valve into an open position when the connector is being operated, and applying a force to the ball valve such that it is urged into a closed position when not being operated; and
     - biasing means for controlling the sealing force provided by the ball valve independently to the valve control system.

2. A connector according to claim 1, wherein the valve control system comprises actuation links, one end of each of which is attached directly to the ball valve, and the other end of each of which is connected to a cam, the cam being arranged to rotate upon operation of the connector to generate relative motion in the actuation links and thereby rotate the ball valve.

3. A connector according to claim 2, wherein the valve control system further comprises a pin and slot which engage, in use, to rotate the cam when the connector is operated.

4. A connector according to claim 1, comprising a second biasing means to bias the valve control system so that the ball valve is urged toward a closed position.

5. A connector according to claim 1, further comprising a diaphragm between the housing unit and the shuttle assembly.

6. A connector according to claim 5, wherein the diaphragm system is made from a thermosetting rubber or metal bellows, to allow for thermal expansion and displacement of the actuation sleeve.

7. A connector according to claim 1, wherein the housing unit comprises vent ports to enable elimination of debris from the connector during engagement.

8. A connector according to claim 1, wherein the ball valve material is either ceramic or metallic.

9. A connector according to claim 1, wherein the ball valve is coated with a low friction coating.

10. A connector according to claim 1, wherein the shuttle assembly is filled with oil optically matched to the fibre optic wand.

11. A connector according to claim 1, wherein optical fibres, of the fibre optic wand, are protected by hermetically sealed, optically clear windows.

12. A connector according to claim 1, wherein the fibre optic wands abut when connected and at least one of the mating elements has a biasing means to cater for stack-up tolerances and abutment in the housing units.

13. A connector according to claim 1, wherein fibre optic wands engage within an alignment sleeve.

14. A connector according to claim 13, wherein the alignment sleeve has fluid ports therein.

15. A connector according to claim 1 arranged to generate a flushing action during engagement.

* * * * *